United States Patent
Herloski et al.

(10) Patent No.: US 7,706,030 B2
(45) Date of Patent: Apr. 27, 2010

(54) DOCUMENT ILLUMINATOR WITH PARABOLIC OPTICAL ELEMENT

(75) Inventors: Robert P. Herloski, Webster, NY (US); Douglas E. Proctor, Gates, NY (US); Jagdish C. Tandon, Fairport, NY (US); Pravin N. Kothari, Poughkeepsie, NY (US); Eric Dudley, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1041 days.

(21) Appl. No.: 11/409,109

(22) Filed: Apr. 21, 2006

(65) Prior Publication Data

US 2007/0247677 A1 Oct. 25, 2007

(51) Int. Cl.
*H04N 1/04* (2006.01)

(52) U.S. Cl. .................. 358/488; 358/471; 358/475; 358/509; 358/484; 382/131; 382/274; 382/275; 250/208.1; 250/455.11; 250/216; 362/346; 362/555

(58) Field of Classification Search .......... 358/474, 358/471, 475, 509, 507, 484, 488; 382/131, 382/133, 274, 275; 250/208.1, 455.11, 216; 362/346, 555
See application file for complete search history.

(56) References Cited

U.S. PATENT DOCUMENTS

| | | | | |
|---|---|---|---|---|
| 5,255,171 A | * | 10/1993 | Clark | 362/231 |
| 5,287,147 A | * | 2/1994 | Fukasawa et al. | 399/211 |
| 6,037,582 A | * | 3/2000 | Youngers et al. | 250/234 |
| 6,118,555 A | * | 9/2000 | Matsuoka et al. | 358/475 |
| 6,236,470 B1 | * | 5/2001 | Seachman | 358/471 |
| 6,507,416 B1 | * | 1/2003 | Tang | 358/475 |
| 6,552,829 B1 | * | 4/2003 | Maciey et al. | 358/509 |
| 7,233,421 B2 | * | 6/2007 | Silverbrook | 358/509 |
| 7,289,156 B2 | * | 10/2007 | Silverbrook et al. | 348/374 |
| 2003/0076551 A1 | * | 4/2003 | Kawai et al. | 358/475 |
| 2004/0057088 A1 | * | 3/2004 | Fukuzawa | 358/509 |
| 2004/0131157 A1 | | 7/2004 | Stevanovic et al. | |
| 2005/0200917 A1 | * | 9/2005 | Kanesaka et al. | 358/486 |
| 2006/0119482 A1 | * | 6/2006 | Hanscom | 340/573.1 |
| 2006/0119899 A1 | * | 6/2006 | Kawai et al. | 358/401 |
| 2008/0055674 A1 | * | 3/2008 | Wilsher et al. | 358/488 |

\* cited by examiner

*Primary Examiner*—Negussie Worku
(74) *Attorney, Agent, or Firm*—Pillsbury Winthrop Shaw Pittman LLP

(57) ABSTRACT

An apparatus for illuminating a document includes an optical element formed of a light-transmissive material of a predetermined refractory index that defines a curved entry surface and an exit surface opposite the entry surface in which light enters the optical element via the entry surface and light exits the optical element via exit surface. A first substantially parabolic surface is defined between a first edge of the entry surface and first edge of the exit surface and a second substantially parabolic surface is defined between a second edge of the entry surface and a second edge of the exit surface such that the first and second substantially parabolic surface are spaced apart more at the exit surface than at the entry surface.

18 Claims, 5 Drawing Sheets

DOCUMENT ILLUMINATOR WITH PARABOLIC OPTICAL ELEMENT

TECHNICAL FIELD

The present disclosure relates to illuminating apparatus used to illuminate hard-copy documents for digital recording, such as in digital scanners, facsimile machines and digital copiers.

BACKGROUND

In office equipment such as digital copiers and facsimile machines, original hard-copy documents are recorded as digital data using what can be generally called a "scanner." In a typical scanner, a document sheet is illuminated and the light reflected from the document sheet is recorded by a photosensitive device such as a CCD or CMOS array, to be converted to digital image data. In one embodiment, a narrow strip of the document sheet is illuminated as the sheet is moved through a document handler, or the photosensitive device is moved relative to a platen on which the document sheet is placed.

Designing an illuminator for a scanner presents challenges in providing, among other aspects, an even illumination along the narrow strip of the document, as well as providing a suitable illumination profile across the narrow strip. Irregularities in the illumination level in the illuminated area will result in defects in the image data. An overview of the art of designing illuminators for scanners is given in U.S. Pat. No. 6,236,470.

One type of illuminator useful in document scanning includes a light-transmissive element that exploits internal reflections to direct light from one or more point sources to emerge in substantially parallel rays from an exit surface of the element toward a document. One known type of optical element, used in various contexts, includes a light-transmissive element that exploits internal reflections to direct light from one or more small sources to emerge in substantially parallel rays from an exit surface of the element. Specifically, one known shape for this purpose is a compound parabolic concentrator, or CPC; uses of the CPC are shown in U.S. Pat. No. 5,255,171 and US Patent Application Publication 2004/0131157.

SUMMARY

According to one aspect, there is provided an apparatus for illuminating a portion of a document to be recorded. An optical element comprises a light-transmissive material of a predetermined refractory index and defines a curved entry surface, and an exit surface opposite the entry surface. A first substantially parabolic surface is defined between a first edge of the entry surface and a first edge of the exit surface, and a second substantially parabolic surface is defined between a second edge of the entry surface and a second edge of the exit surface.

According to another aspect, here is provided an apparatus for illuminating a portion of a document to be recorded. An optical element comprises a light-transmissive material of a predetermined refractory index and defines an entry surface, and a curved exit surface opposite the entry surface. A first substantially parabolic surface is defined between a first edge of the entry surface and a first edge of the exit surface, and a second substantially parabolic surface is defined between a second edge of the entry surface and a second edge of the exit surface.

According to another aspect, here is provided an apparatus for illuminating a portion of a document to be recorded. An optical element comprises a light-transmissive material of a predetermined refractory index and defines an entry surface, and an exit surface opposite the entry surface. A first substantially parabolic surface is defined between a first edge of the entry surface and a first edge of the exit surface, and a second substantially parabolic surface is defined between a second edge of the entry surface and a second edge of the exit surface, the parabolic surfaces substantially defining a CPC, wherein the CPC defines a theoretical full length relating to the curvatures of the first substantially parabolic surface and the second substantially parabolic surface. The CPC has an actual length of about 0.5 to about 0.9 of the theoretical full length.

According to another aspect, here is provided an apparatus for illuminating a portion of a document to be recorded. An optical element comprises a light-transmissive material of a predetermined refractory index and defines an entry surface, and a curved exit surface opposite the entry surface. A first substantially parabolic surface is defined between a first edge of the entry surface and a first edge of the exit surface, and a second substantially parabolic surface is defined between a second edge of the entry surface and a second edge of the exit surface. The optical element defines a tilt angle in the exit surface thereof, the tilt angle being between five and fifteen degrees from perpendicular to the length of the optical element.

DETAILED DESCRIPTION

Figure 1:
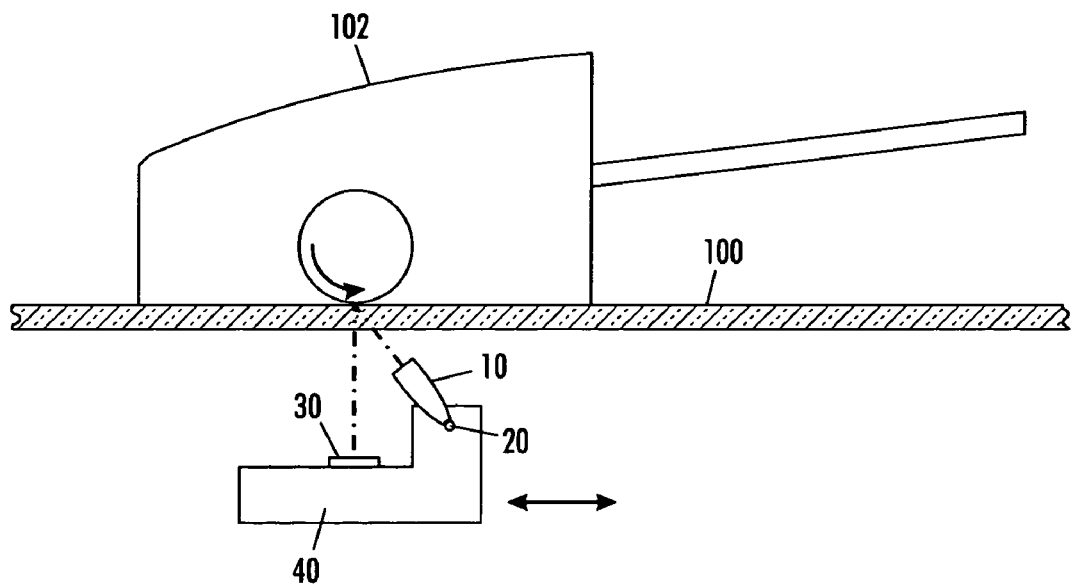
FIG. 1 is a simplified elevational view of a document scanner.

FIG. 1 is a simplified elevational view of a document scanner. There is provided a platen 100, which may have distinct parts, on which a document sheet can be placed for recording therefrom. Also associated with platen 100 is a document handler generally indicated as 102, which can be of any design known in the art. The document handler sequentially feeds sheets from a multi-page original document past a scan head comprising an illuminator including an optical element 10 a linear array of light sources 20, and a photosensitive device 30. The illuminator illuminates a thin strip of the document while the photosensitive device 30, which includes one or more linear arrays of photosensors, records the reflected light. (There is typically another lens, not shown, interposed between the platen 100 and the photosensitive device 30.) The scan head can be mounted on a moveable carriage 40, for recording light reflected from images on sheets placed on the main portion of platen 100. The optical element is arranged at an angle relative to a surface of the document being recorded.

Figure 2:
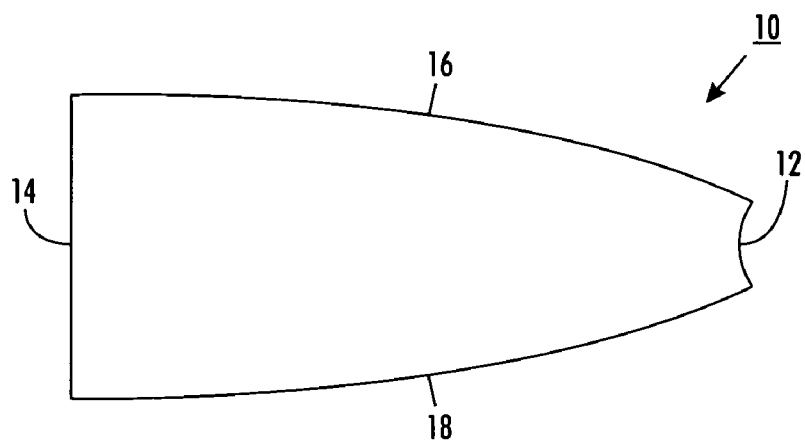
FIG. 2 is a sectional view of an optical element in isolation.

FIG. 2 is a sectional view of an optical element 10 in isolation. In one embodiment, the profile shown in FIG. 2 is substantially the same along the entire page width of the optical element 10, i.e., in the dimension coming out of the picture. The optical element 10 can be made of any light-transmissive material, such as glass or plastic, of a predetermined refractory index.

The optical element 10 defines an entry surface 12; an exit surface 14; and a first parabolic surface 16 and second parabolic surface 18. In each case the more curved portion of each parabolic surface 16, 18 is disposed near the entry surface 12, as shown. The exit surface 14 is the surface through which light is directed toward a document, such as shown in FIG. 1. In a practical embodiment, the width (the vertical dimension as shown in the Figure) of entry surface 12 is in a range of about 0.3-2.0 mm; the width of exit surface 14 is in a range of about 2-10 mm; and the length of the parabolic surfaces is in a range of about 10-30 mm.

The parabolic surfaces 16, 18 need be only generally parabolic in shape. In one practical embodiment, each parabolic surface 16, 18 can closely follow the shape of half a true parabola. This profile generally forms what is known as a compound parabolic contractor, or CPC. When the CPC is formed from a solid, light-transmissive member exploiting light refraction and total internal reflection, the CPC is typically known as a "dielectric compound parabolic contractor," or DCPC, but it is conceivable that the optical effect of the CPC can alternatively be obtained with reflective surfaces.

Figure 3:
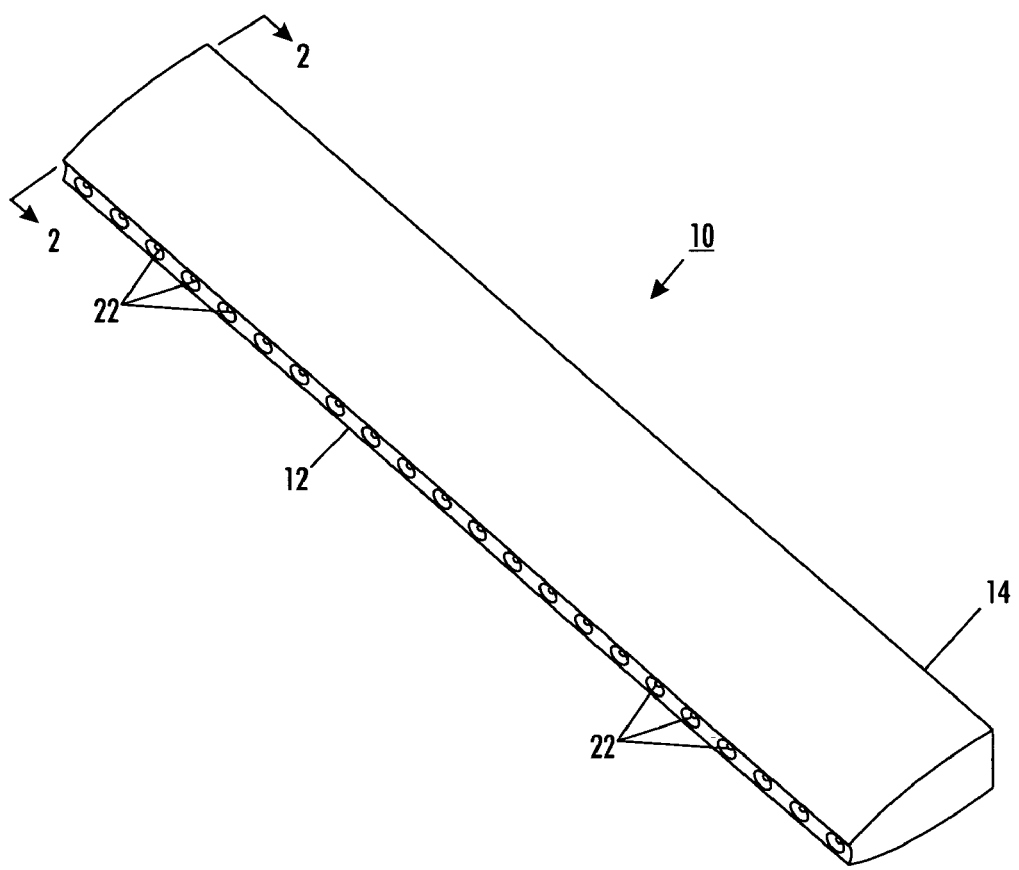
FIG. 3 is a simplified perspective view of an optical element in isolation.

FIG. 3 is a simplified perspective view of an optical element 10 (with the line marked 2-2 indicating the section shown in FIG. 2). If the small, point-like light sources (such as 20 in FIG. 1) are in the form of small LED's, each source 20 can be disposed within a dimple-shaped concavity in entry surface 12, such as shown as 22. Alternatively, the concave structure of entry surface 12 can be in the form of a concave channel extending the length of optical element 10. The entry surface 12 can also be a convex surface. Also alternative, the linear array of point-like light sources could be replaced with a single extended light source, such as a fluorescent lamp, or a single LED extending substantially the length of optical element 10.

Figure 4:
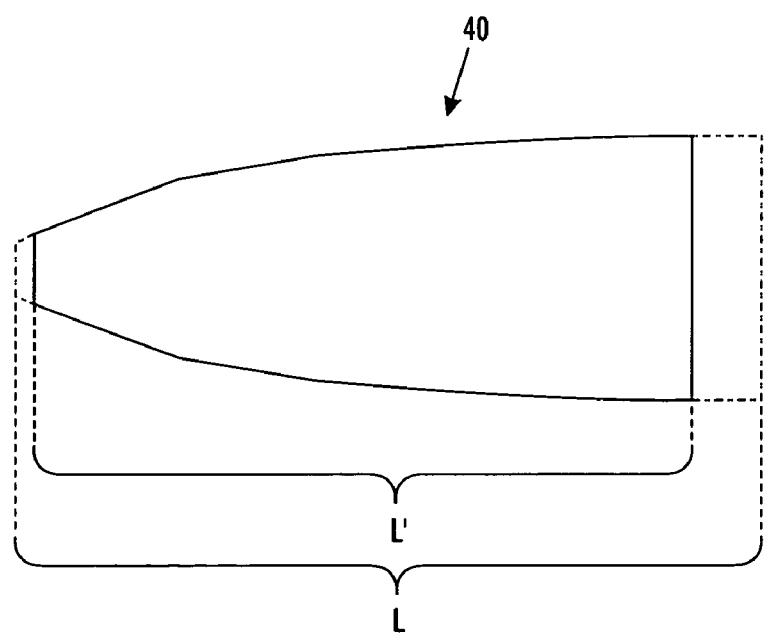
FIG. 4 is a sectional view of an optical element in isolation.
Figure 5:
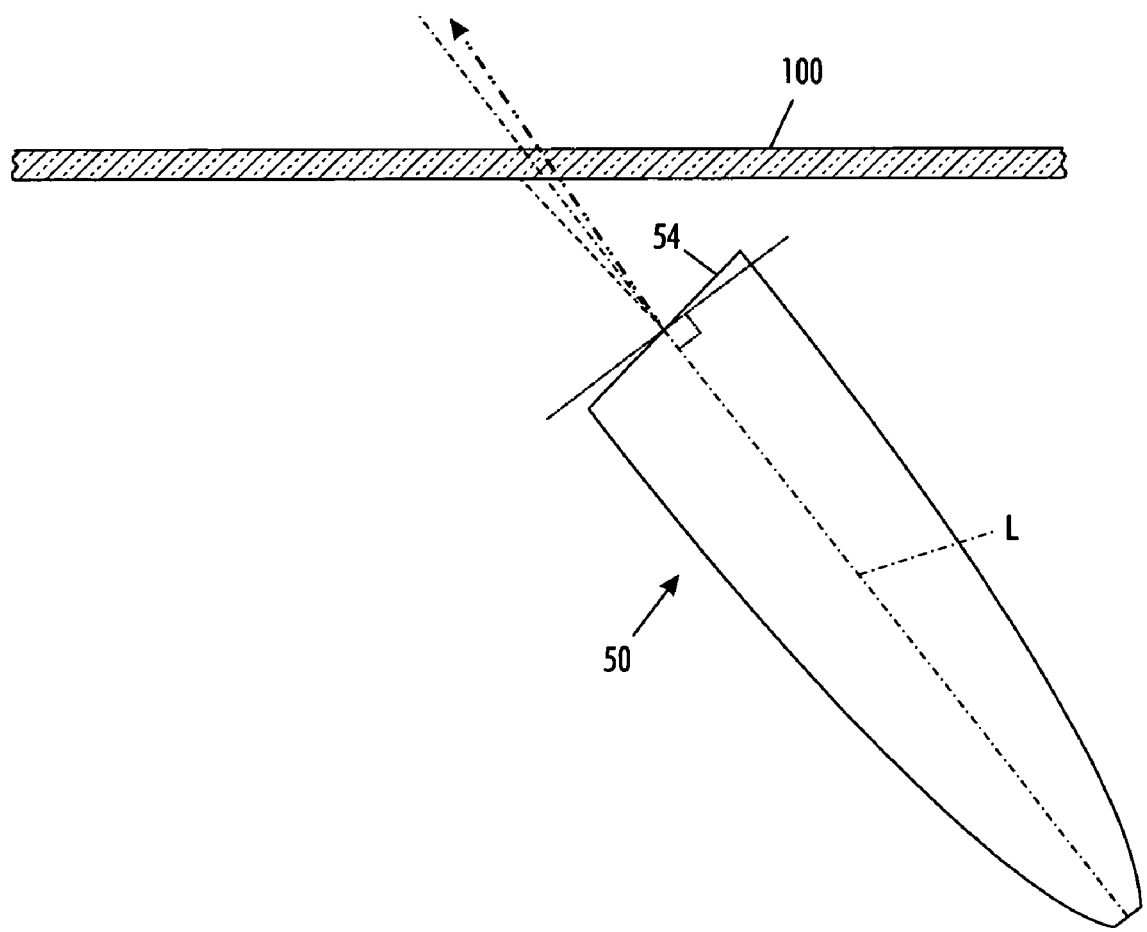
FIG. 5 is a sectional view of an optical element in combination with a portion of a platen.
Figure 6:
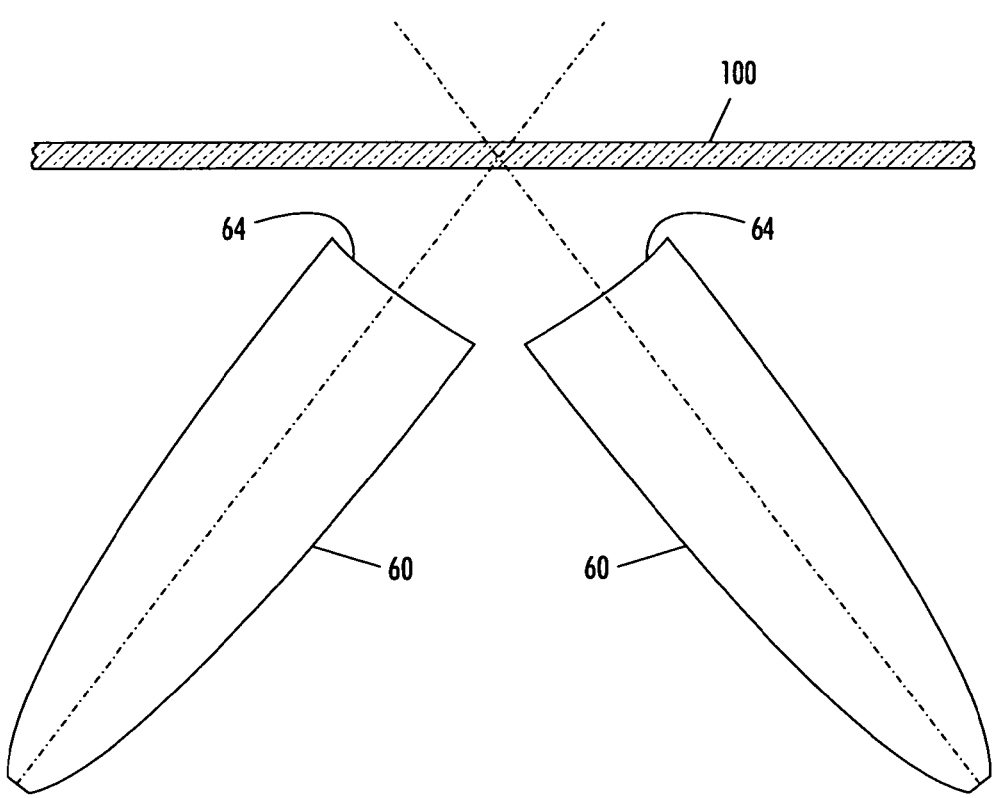
FIG. 6 is a sectional view of a pair of optical elements in combination with a portion of a platen.

FIGS. 4, 5, and 6 show alternate embodiments, each having one or more CPC's of various designs. In the FIG. 4 embodiment, the CPC, indicated as 40 but substantially substitutable for the CPC 10 in the above-described embodiment, is in the form of a truncated CPC; that is, the solid member forming CPC 40 includes curved surfaces consistent with a "full" CPC shape, but encompasses only a portion of a total theoretical length L of the CPC shape.

In order to calculate the theoretical length L of a DCPC, as well as determine the characteristics of the parabolic surfaces 16, 18, the following equations can be used:

let a=exit surface ½ width;

a'=entrance surface ½ width;

n=refractive index of DCPC.

$\theta_i' = \sin^{-1}(a'/a)$ theoretical "full" length $L=(a+a')/\tan \theta_i'$.

(The parabolic surfaces of such a DCPC are defined as follows:

$f=a'*(1+\sin\theta_i')$ $R=2f$ $\Delta y = \pm(a'-f*\sin\theta_i')$ $\Delta z = -f*\cos\theta_i'$.)

Once the theoretical full length L of a DCPC is determined, a portion of the theoretical full DCPC can be used. In one practical embodiment, the actual length L', such as shown in FIG. 4, is between about 0.5 and about 0.9 of the theoretical full length L of the DCPC. When selecting what portion of the full DCPC to use, material from either the entrance or exit "ends" of the DCPC can be in effect "removed," but there is more design latitude in removing material from the wider, exit end.

The FIG. 5 embodiment shows a CPC 50, once again substantially substitutable for the CPC 10 in the above-described embodiment, which defines a "tilt" in the exit surface 54 thereof which is about ten degrees, or more broadly between five and fifteen degrees, from perpendicular to a (theoretical or actual) length L of the CPC 50. In one practical implementation, the DCPC 50, having the ten-degree tilt in the exit surface 54, is disposed at about 37 degrees relative to normal to the platen 100. The specific tilt of the exit surface 54 and the angle with regard to the platen 100 may be determined with regard to overall illumination objectives of the apparatus, such as how large a band of a document is desired to be illuminated, or a desired profile of illumination across such a band.

The FIG. 6 embodiment shows a pair of CPC's 60, each once again substantially substitutable for the CPC 10 in the above-described embodiment. Each CPC 60 defines a relatively shallow radius, here shown as a concavity but which could alternatively be a convexity, in the exit surface 64 thereof. In one practical implementation, the concave radius is about 20 mm, each CPC is disposed at about 37 degrees relative to normal to the platen 100, and the adjacent edges of the exit surfaces of the two CPC's are about 6.4 mm apart. The specific dimensions, angles, and other parameters of a practical implementation may be determined with regard to overall illumination objectives of the apparatus, such as how large a band of a document is desired to be illuminated, or a desired profile of illumination across such a band.

In practical implementations of any of the above-described embodiments, other considerations affecting desirable designs include a distance of the CPC to a target; a gap length between the light sources and the CPC; as well as specific characteristics of the LED's or other light sources, such as the angles of emission thereof.

Although the FIG. 6 embodiment shows the use of multiple CPC's and accompanying sets of light sources, any of the above-described embodiments can be adapted for scanner with two or more CPC's directing light to substantially the same small area of a document to be illuminated. One common reason to use two CPC's with accompanying sets of light sources is to suppress shadows on the recorded image caused by paste-ups in the original document on the platen.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. An apparatus for illuminating a portion of a document to be recorded, comprising:
   an optical element comprising a light-transmissive material of a predetermined refractory index and defining a curved entry surface,
   an exit surface opposite the entry surface, wherein light enters the optical element via the entry surface and light exits the optical element via the exit surface, a first substantially parabolic surface defined between a first edge of the entry surface and a first edge of the exit surface, and a second substantially parabolic surface defined between a second edge of the entry surface and a second edge of the exit surface, wherein the first and second substantially parabolic surfaces are spaced apart more at the exit surface than at the entry surface.

2. The apparatus of claim 1, the curved entry surface defining a concave channel.

3. The apparatus of claim 2, further comprising at least one light source, at least partially disposed in the concave channel.

4. The apparatus of claim 1, the curved entry surface defining at least one concave dimple.

5. The apparatus of claim 4, further comprising at least one light source, at least partially disposed in the concave dimple.

6. The apparatus of claim 1, the first substantially parabolic surface and the second substantially parabolic surface effectively forming a CPC.

7. An apparatus for illuminating a portion of a document to be recorded, comprising:

an optical element comprising a light-transmissive material of a predetermined refractory index and defining an entry surface, an curved exit surface opposite the entry surface, wherein light enters the optical element via the entry surface and light exits the optical element via the exit surface, a first substantially parabolic surface defined between a first edge of the entry surface and a first edge of the exit surface, and a second substantially parabolic surface defined between a second edge of the entry surface and a second edge of the exit surface, wherein the first and second substantially parabolic surfaces are spaced apart more at the exit surface than at the entry surface.

8. The apparatus of claim 7, the optical element defining a concavity in the exit surface thereof.

9. The apparatus of claim 7, the first substantially parabolic surface and the second substantially parabolic surface effectively forming a CPC.

10. The apparatus of claim 7, further comprising a light source disposed generally adjacent the entry surface, the optical element and the light source being disposed on a movable carriage.

11. The apparatus of claim 7, further comprising a platen for supporting the document, the plate being disposed generally adjacent the exit surface.

12. The apparatus of claim 7, further comprising
a second optical element; and
a second light source associated with the second optical element.

13. An apparatus for illuminating a portion of a document to be recorded, comprising:

an optical element comprising a light-transmissive material of a predetermined refractory index and defining an entry surface, an exit surface opposite the entry surface, wherein light enters the optical element via the entry surface and light exits the optical element via the exit surface, a first substantially parabolic surface defined between a first edge of the entry surface and a first edge of the exit surface, and a second substantially parabolic surface defined between a second edge of the entry surface and a second edge of the exit surface, the parabolic surfaces substantially defining a CPC;

wherein the CPC defines a theoretical full length relating to the curvatures of the first substantially parabolic surface and the second substantially parabolic surface, and the CPC having an actual length of about 0.5 to about 0.9 of the theoretical full length.

14. The apparatus of claim 13, further comprising
a light source disposed generally adjacent the entry surface, the optical element and the light source being disposed on a movable carriage.

15. The apparatus of claim 13, further comprising a platen for supporting the document, the plate being disposed generally adjacent the exit surface.

16. An apparatus for illuminating a portion of a document to be recorded, comprising:

an optical element comprising a light-transmissive material of a predetermined refractory index and defining an entry surface;

an exit surface opposite the entry surface, a length being defined between the entry surface and the exit surface, wherein light enters the optical element via the entry surface and light exits the optical element via the exit surface;

a first substantially parabolic surface defined between a first edge of the entry surface and a first edge of the exit surface, and a second substantially parabolic surface defined between a second edge of the entry surface and a second edge of the exit surface;

the optical element defining a tilt angle in the exit surface thereof, the tilt angle being between five and fifteen degrees from perpendicular to the length of the optical element.

17. The apparatus of claim 16, further comprising a light source disposed generally adjacent the entry surface, the optical element and the light source being disposed on a movable carriage.

18. The apparatus of claim 16, further comprising a platen for supporting the document, the plate being disposed generally adjacent the exit surface.

* * * * *